Patented Jan. 1, 1924.

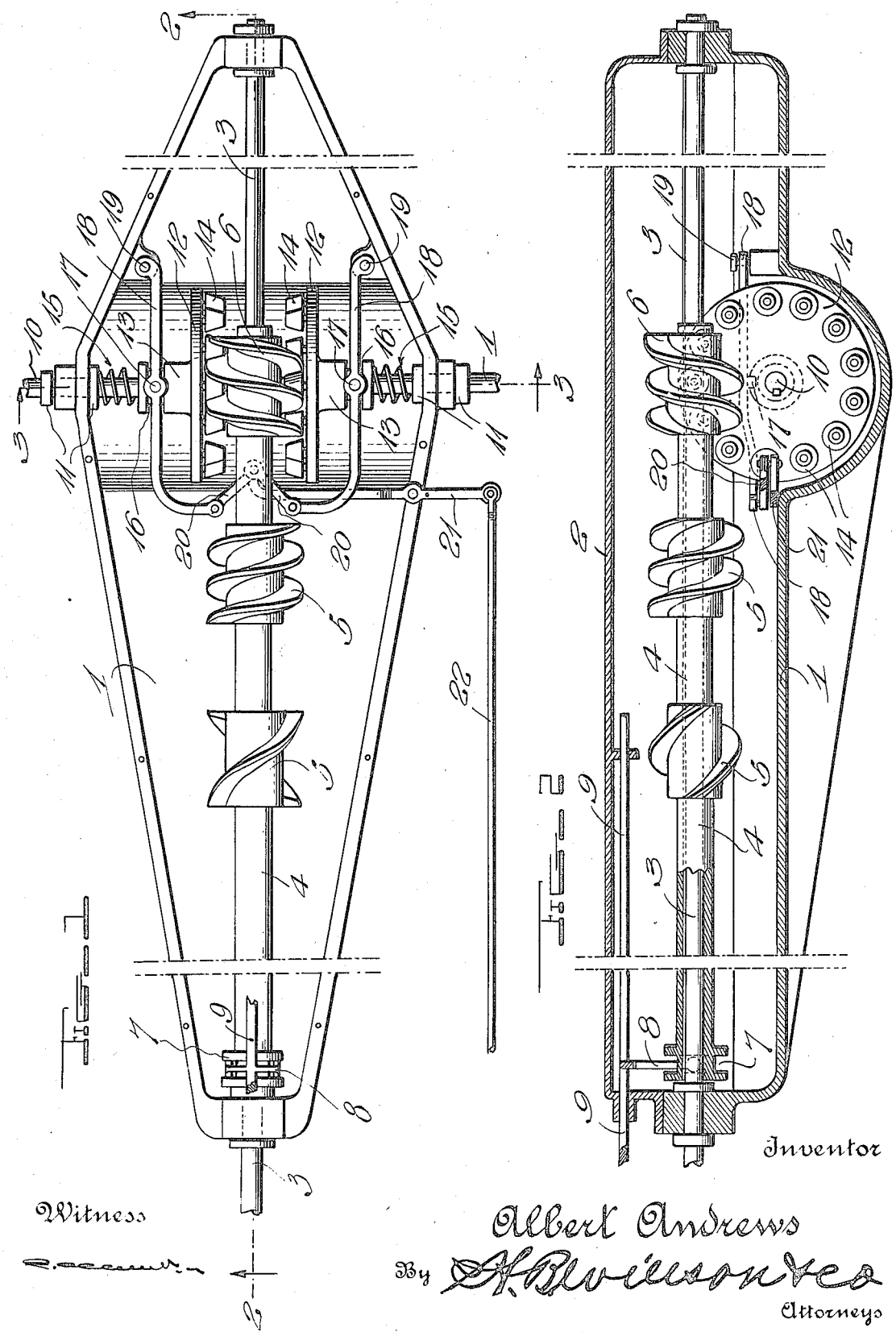

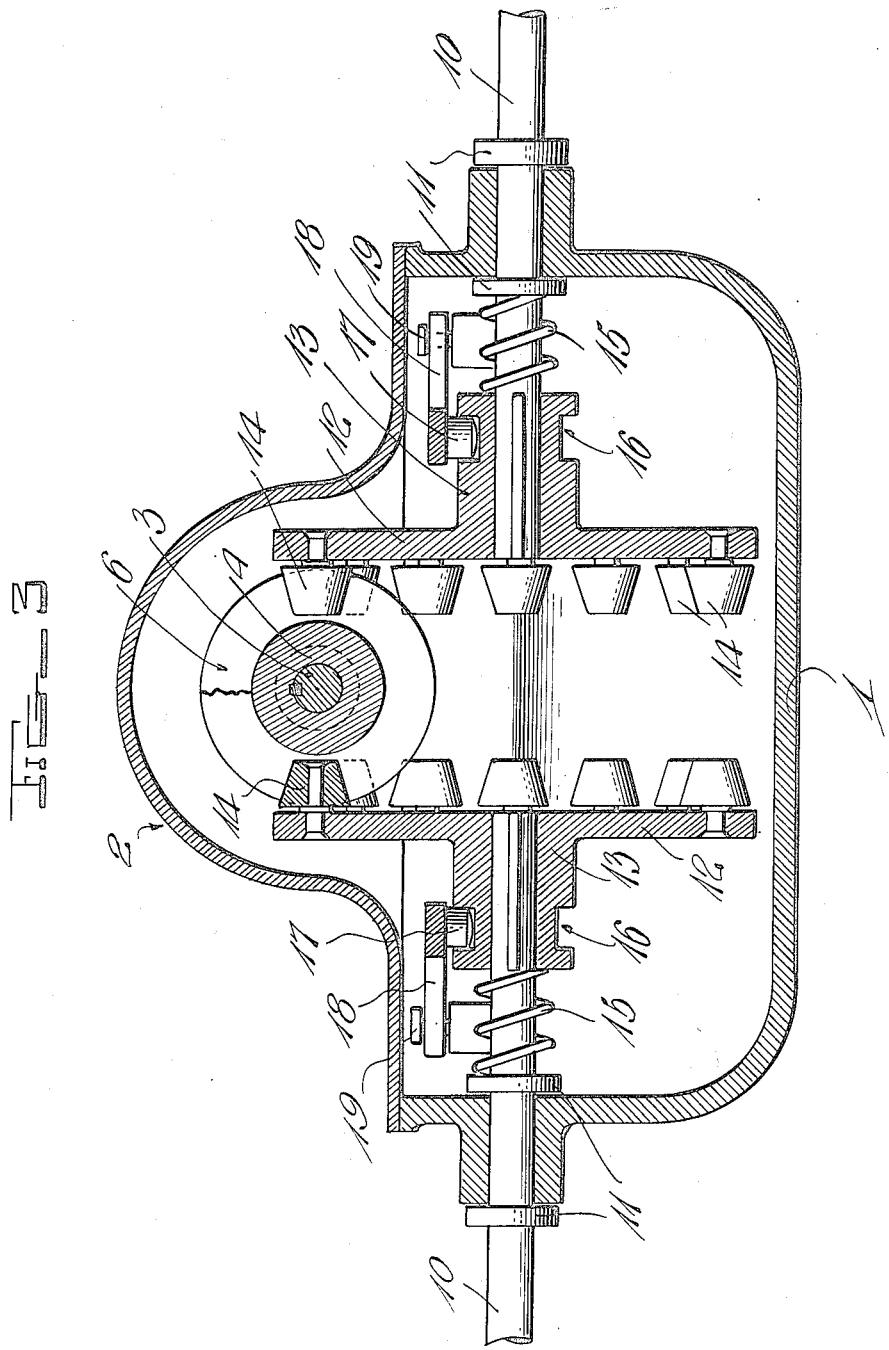

1,479,167

UNITED STATES PATENT OFFICE.

ALBERT ANDREWS, OF SHERIDAN, WYOMING, ASSIGNOR, BY DIRECT AND MESNE ASSIGNMENTS, TO ANDREWS WORM TRANSMISSION CORPORATION, A CORPORATION OF WYOMING.

TRANSMISSION MECHANISM.

Application filed January 8, 1923. Serial No. 611,446.

*To all whom it may concern:*

Be it known that I, ALBERT ANDREWS, a citizen of the United States, residing at Sheridan, in the county of Sheridan and State of Wyoming, have invented certain new and useful Improvements in Transmission Mechanisms; and I do declare the following to be a full, clear, and exact description of the invention, such as will enable others skilled in the art to which it appertains to make and use the same.

My invention relates to transmission mechanisms and more particularly to those of the type employing a plurality of differently pitched worms for obtaining different speeds by bringing them into mesh with other gearing. In mechanisms of this character, it has been proposed to employ a spur gear for co-action with the worms, but as this gear must be constructed to cooperate with worms of different pitches, difficulty has been encountered in providing a gear which will snugly mesh with any of the worms and will not permit "backlash."

It is one object of my invention to overcome the difficulties above pointed out by providing a pair of axially alined crown gears with both of which any of the worms mesh. Thus, diametrically opposite points of the worm are simultaneously in operation and the mechanism will operate much more advantageously.

A further object of the invention is to provide novel means for axially shifting the crown gears away from each other when one worm is to be disengaged from said gears and another moved into operative relation therewith.

With the foregoing in view, the invention resides in the novel subject matter hereinafter described and claimed, the description being supplemented by the accompanying drawings.

Figure 1 is a plan view of a transmission mechanism constructed in accordance with my invention, the transmission cover being removed.

Figure 2 is a longitudinal sectional view as indicated by line 2—2 of Fig. 1.

Figure 3 is a vertical transverse sectional view as indicated by line 3—3 of Fig. 1.

In the drawings above briefly described, I have shown one form of construction for illustrative purposes only, and while this construction is described in detail, it will be understood that numerous refinements and minor changes may be resorted to in the manufacture of the invention.

The numeral 1 designates an elongated transmission casing preferably having a removable cover 2. Extending longitudinally through this casing, is a drive shaft 3 upon which a sleeve 4 is splined, said sleeve carrying a pair of differently pitched worms 5 for forward driving at different speeds, and also having a reversely pitched worm 6 for driving rearwardly. For sliding the sleeve 4, any adequate means may be employed, but I have shown the front end of said sleeve formed with a peripheral groove 7 receiving a suitable shifting fork 8 on a longitudinally slidable rod 9. In practice, a suitably constructed thrust bearing will be employed at this point to receive the longitudinal thrusts of the sleeve caused by engagement of the worms with the crown gears described below.

A pair of axially alined shafts 10 extend through opposite sides of the transmission casing 1 and in the present showing are held against longitudinal sliding by collars 11. The inner ends of these shafts carry a pair of crown gears 12 which are preferably of the roller type, the hubs 13 of said crown gears being splined upon the shafts to permit axial shifting of said gears. The axis of the shafts 10 is spaced either below or above the axis of the worms 5 and 6 so that the latter may properly mesh with the inwardly extending teeth or rollers 14 of the gears 12 and in view of the fact that the mechanism can be more smoothly shifted from one speed to another, by spreading the gears 12, I provide a novel arrangement of parts for producing this result, but the gears in question are normally forced inwardly to operatively engage one or the other of the worms, by a pair of coiled springs 15 which are shown surrounding the shafts 10 between the innermost collars 11 and the gear hubs 13.

For illustrative purposes, I have shown the hubs 13 provided with peripheral grooves 16 receiving suitable rollers, studs or the like 17 on a pair of horizontally swingable levers 18. These levers are fulcrumed at one end to the transmission casing as indicated at 19, while their other ends preferably turn inwardly toward each other and are connected by a pair of toggle links 20. By moving these toggle links toward alinement with each other, it will be seen that the levers 18 are forced outwardly, thereby spreading the crown gears 12 to disengage them from one of the worms, whereupon the sleeve 4 may be axially shifted to bring the proper worm between the gears. When this has been done, movement of the toggle links in the opposite direction will cause return of the crown gears to operative position.

While any desired means may be employed for operating the toggle links 20, I have shown a horizontally movable lever 21 extending through an opening in the transmission casing and connected at its inner end with said links, the outer end of said lever being pivoted to an appropriate operating rod 22.

By employing the construction shown and described or a substantial equivalent thereof, a variable speed and reverse mechanism is provided which will be extremely advantageous for numerous purposes. If desired, when the mechanism is used on tractors or like machines, the ordinary clutch may be dispensed with, as the crown gears 12 may be moved outwardly away from the worms with which they have been co-operating, for the purpose of discontinuing the transmission of power to the wheels. To again start the driving operation, it is simply necessary to again move the gears inwardly into mesh with the worms and no serious results will follow, in view of the slow rate of speed at which the machine is operating.

When the mechanism is used on motor trucks or automobiles, it is preferable to use an ordinary clutch at a suitable point and furthermore, it may be explained that while no differential mechanism has been shown, one may be installed at any desired point. For instance, the usual differential could be located between the shafts 10, in which instance the crown gears 12 would assume slightly different forms and would take the place of the usual ring gear on the differential mechanism.

As excellent results may be obtained from the general construction disclosed, it may be followed if desired. However, as above pointed out, it is to be understood that the present disclosure is for illustrative purposes only and that within the scope of the invention as claimed, numerous minor changes may be made.

I claim:

1. A transmission mechanism comprising a pair of axially alined crown gears mounted for axial shifting and having inwardly extending teeth, axially shiftable and axially alined worms adapted to mesh one at a time with said crown gears, a pair of levers connected with the hubs of said crown gears and fulcrumed to a relatively stationary part, a pair of toggle lnks connecting said levers, means for actuating said toggle links to swing said levers and axially shift said crown gears, and means for axially shifting said worms.

2. A transmission mechanism comprising a pair of axially shiftable and axially alined crown gears, springs normally pressing said crown gears inwardly toward each other, a plurality of axially alined worms adapted for mesh one at a time with said crown gears, means for shifting said crown gears outwardly against the action of said springs, and means for axially shifting said worms.

3. A transmission mechanism comprising a pair of opposed bearings, axles journalled in said bearings, said axles being in horizontal alinement and having their inner ends spaced from each other, gears shiftably mounted on said axles said gears being spaced from one another, springs interposed between the gears and bearings, a shaft extending between and disposed in spaced parallelism to said gears, a sleeve slidably mounted on said shaft, a series of longitudinally spaced worms carried by said sleeve and adapted to be selectively engaged with said gears, and manual control levers connected with said gears for moving them away from each other to permit engagement or disengagement of said worms.

In testimony whereof I have hereunto affixed my signature.

ALBERT ANDREWS.